(12) United States Patent
Kojo et al.

(10) Patent No.: US 8,565,976 B2
(45) Date of Patent: Oct. 22, 2013

(54) VEHICLE TRAVEL CONTROL DEVICE

(75) Inventors: Takahiro Kojo, Gotenba (JP); Theerawat Limpibunterng, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 630 days.

(21) Appl. No.: 12/738,092

(22) PCT Filed: Nov. 19, 2008

(86) PCT No.: PCT/JP2008/071483
§ 371 (c)(1),
(2), (4) Date: Apr. 15, 2010

(87) PCT Pub. No.: WO2009/066793
PCT Pub. Date: May 28, 2009

(65) Prior Publication Data
US 2010/0228444 A1  Sep. 9, 2010

(30) Foreign Application Priority Data

Nov. 19, 2007  (JP) ................................ 2007-299488

(51) Int. Cl.
*B62D 6/00* (2006.01)

(52) U.S. Cl.
USPC ............................................. 701/41; 701/48

(58) Field of Classification Search
USPC ........... 701/41, 42, 48, 69, 71, 72, 78, 79, 38, 701/68, 799
See application file for complete search history.

(56) References Cited

U.S. PATENT DOCUMENTS

| 4,953,650 | A | * | 9/1990 | Ohmura ........................ 180/412 |
| 5,265,019 | A | * | 11/1993 | Harara et al. ................... 701/41 |
| 5,524,079 | A | | 6/1996 | Ishida et al. |

(Continued)

FOREIGN PATENT DOCUMENTS

| JP | 63 203472 | 8/1988 |
| JP | 6 316273 | 11/1994 |

(Continued)

*Primary Examiner* — Khoi Tran
*Assistant Examiner* — Adam Mott
(74) *Attorney, Agent, or Firm* — Oblon, Spivak, McClelland, Maier & Neustadt, L.L.P.

(57) ABSTRACT

An object of the present invention is to cover a drop in turning responsiveness of a vehicle to a driver's steering operation caused by a limit on the operating speed of a steerable wheel turning unit by a turn assist yaw moment independent of turn lateral forces of steerable wheels to thereby prevent the drop in turning responsiveness of the vehicle when the operating speed of the steerable wheel turning unit is limited. A vehicle travel control device comprises a steerable wheel turning unit capable of turning steerable wheels to steer independently of steering of a driver and a braking unit as a turn assist yaw moment generating means capable of generating a turn assist yaw moment independently of turn lateral forces of the steerable wheels. When a predetermined controlled variable limiting condition is established and the controlled variable of the steerable wheel turning unit is limited, the influence of limiting the controlled variable of the steerable wheel turning unit on the turn yaw moment of the vehicle can be reduced by changing braking forces of individual wheels and generating a yaw moment by differences in braking force between left and right wheels.

12 Claims, 9 Drawing Sheets

(56) References Cited

U.S. PATENT DOCUMENTS

| | | | |
|---|---|---|---|
| 6,108,599 A * | 8/2000 | Yamamoto et al. | 701/41 |
| 6,131,688 A * | 10/2000 | Fukada | 180/408 |
| 6,205,375 B1 * | 3/2001 | Naito | 701/1 |
| 7,065,442 B2 * | 6/2006 | Sakata | 701/72 |
| 7,966,113 B2 * | 6/2011 | Kroehnert et al. | 701/41 |
| 2003/0060959 A1 * | 3/2003 | Lin et al. | 701/70 |
| 2004/0148077 A1 * | 7/2004 | Yasui et al. | 701/41 |
| 2005/0102085 A1 * | 5/2005 | Sakata | 701/72 |
| 2005/0216157 A1 * | 9/2005 | Sakata | 701/42 |
| 2006/0020382 A1 * | 1/2006 | Shin et al. | 701/42 |
| 2006/0149447 A1 * | 7/2006 | Williston et al. | 701/41 |
| 2006/0289226 A1 * | 12/2006 | Sugitani | 180/402 |
| 2007/0039775 A1 * | 2/2007 | Matsuno et al. | 180/446 |
| 2007/0055431 A1 * | 3/2007 | Deng et al. | 701/71 |
| 2007/0265750 A1 * | 11/2007 | Goto et al. | 701/41 |
| 2008/0109133 A1 * | 5/2008 | Bedner et al. | 701/41 |
| 2008/0119988 A1 * | 5/2008 | Yasui et al. | 701/41 |
| 2008/0195280 A1 * | 8/2008 | Deng et al. | 701/41 |
| 2008/0208406 A1 * | 8/2008 | Chen et al. | 701/41 |
| 2008/0319613 A1 * | 12/2008 | Mikuriya et al. | 701/42 |
| 2009/0118905 A1 * | 5/2009 | Takenaka et al. | 701/41 |

FOREIGN PATENT DOCUMENTS

| | | | |
|---|---|---|---|
| JP | 9 193824 | | 7/1997 |
| JP | 2005 145106 | | 6/2005 |
| JP | 2006 131141 | | 5/2006 |
| JP | 2006131141 A | * | 5/2006 |
| JP | 2006 306326 | | 11/2006 |
| JP | 2007 38824 | | 2/2007 |
| JP | 2007 62654 | | 3/2007 |

* cited by examiner

VEHICLE TRAVEL CONTROL DEVICE

TECHNICAL FIELD

The present invention relates to a vehicle travel control device and, more particularly, to a vehicle travel control device having a steerable wheel turning unit capable of turning steerable wheels to steer independently of steering of a driver and a turn assist yaw moment generating unit capable of generating a turn assist yaw moment independently of turn lateral forces of the steerable wheels.

BACKGROUND ART

As one of vehicle travel control devices, there has been well known a steering device of transfer ratio varying type which has a transfer ratio varying actuator that varies a transfer ratio of rotational angle from a steering input shaft to a steering output shaft, a steering operation force alleviating actuator that generates an assist torque for alleviating the load on steering operation of a driver, and a control means that controls the operations of the transfer ratio varying actuator and the steering operation force alleviating actuator. Such a device is described, for example, in Japanese Patent Laid-Open Publication No. 2006-131141 which corresponds to an application filed by the same applicant as the present application.

As is described in Japanese Patent Laid-Open Publication No. 2006-131141, it has already been known that in a steering device of transfer ratio varying type, it is preferable to compare the operational velocity of the steering operation force alleviating actuator and the rotation angular velocity of the steering output shaft with each other and to control the operation of the steering device of transfer ratio varying type at a velocity below the operational velocity of the steering operation force alleviating actuator.

According to such a steering device of transfer ratio varying type as described in the above publication, the operational velocity of the steering device of transfer ratio varying type can be limited to a rotation angular velocity which is below the operational velocity of the steering operation force alleviating actuator, which enables to prevent the rotational speed of the steering output shaft attained by the operation of the steering device of transfer ratio varying type from exceeding the operational velocity of the steering operation force alleviating actuator. Accordingly, a deterioration of steering feeling and an increase of steering operational load can be prevented from occurring which are caused by the rotational speed of the steering output shaft exceeding the operational velocity of the steering operation force alleviating actuator.

However, if the operational velocity of the steering device of transfer ratio varying type is limited to a rotation angular velocity which is below the operational velocity of the steering operation force alleviating actuator, a transfer ratio of rotational angle from a steering input shaft to a steering output shaft is as well restricted to a small value. Therefore, in such a steering device of transfer ratio varying type as described in the above publication, a vehicle turning responsiveness to steering operation of a driver inevitably decreases.

In particular, such a problem is notable when a steering operation is conducted at a very higher speed by a driver, such as in the case of urgent steering for avoiding collision against an obstacle. The above problem is not confined to a steering device of transfer ratio varying type having a transfer ratio varying actuator which varies a transfer ratio of rotational angle from a steering input shaft to a steering output shaft. That is, the problem occurs as well when a ratio of the velocity of turning steerable wheels to the velocity of steering operation of a driver is restricted in a so-called steer-by-wire type steering control device which has a steering input means operated by a driver and an actuator for drivingly turns steerable wheels to steer, and is capable of turning steerable wheels independently of steering operation of a driver.

DISCLOSURE OF THE INVENTION

A primary object of the present invention is to cover a drop in turning responsiveness of a vehicle to steering operation of a driver by a turn assist yaw moment, in a vehicle having a turn assist yaw moment generating unit capable of generating a turn assist yaw moment independently of turn lateral forces of steerable wheels, to thereby prevent the drop in turning responsiveness of the vehicle when the operating speed of the steerable wheel turning unit is limited.

The present invention provides a vehicle travel control device having a steerable wheel turning means capable of turning steerable wheels to steer independently of steering operation of a driver and a turn assist yaw moment generating means capable of generating a turn assist yaw moment independently of lateral forces of the steerable wheels, wherein the vehicle travel control device has a control means which alters a controlled variable of the turn assist yaw moment generating means to thereby reduce the influence of limiting the controlled variable of the steerable wheel turning means on a turn yaw moment of the vehicle when a predetermined limiting condition is established and a controlled variable of the steerable wheel turning means is limited.

According to the above-described configuration, the influence of limiting the controlled variable of the steerable wheel turning means on a turn yaw moment of the vehicle is reduced by altering a controlled variable of the turn assist yaw moment generating means when a predetermined limiting condition is established and a controlled variable of the steerable wheel turning means is limited. Accordingly, the influence of limiting the controlled variable of the steerable wheel turning means on a turn yaw moment of the vehicle can be reduced by altering a controlled variable of the turn assist yaw moment generating means, which enables to effectively suppress a drop in turning responsiveness of the vehicle to steering operation of a driver even when a controlled variable of the steerable wheel turning means is limited.

The above-mentioned configuration may be such that: the steerable wheel turning means has a wheel-turning controlled variable determining means which determines a wheel-turning controlled variable of the steerable wheel turning means for the steerable wheels in accordance with steering operation of a driver, a limit value determining means which determines a limit value on the wheel-turning controlled variable when the predetermined limiting condition is established, and a wheel-turning controlled variable limiting means which limits the wheel-turning controlled variable with the limit value.

According to this configuration, a wheel-turning controlled variable of the steerable wheel turning means for the steerable wheels is determined in accordance with steering operation of a driver; a limit value on the wheel-turning controlled variable is determined when the predetermined limiting condition is established; and the wheel-turning controlled variable is limited with the limit value. Accordingly, the influence of limiting the controlled variable of the steerable wheel turning means with the limit value on a turn yaw moment of the vehicle can be reduced, which enables to effectively suppress a drop in turning responsiveness of a vehicle.

The above-mentioned configuration may be such that: the steerable wheel turning means operates with an electric energy supplied from a power source and the control means determines that the predetermined limiting condition is established when the electric energy consumed by the steerable wheel turning means is to be saved.

According to this configuration, when the electric energy consumed by the steerable wheel turning means is to be saved, the determination that the predetermined limiting condition is established can surely be made.

The above-mentioned configuration may be such that: the vehicle has a steering assist force generating means which operates with an electric energy supplied from a power source and generates a steering assist force at least in accordance with steering reactive force and the control means determines that the predetermined limiting condition is established when the velocity of turning the steerable wheels by the steerable wheel turning means is to be reduced in magnitude in order to ensure the capability of the steering assist force generating means to generate a required steering assist force.

According to this configuration, when the velocity of turning the steerable wheels by the steerable wheel turning means is to be reduced in magnitude in order to ensure the capability of the steering assist force generating means to generate a required steering assist force, the determination that the predetermined limiting condition is established can surely be made.

The above-mentioned configuration may be such that: the steering assist force generating means is a braking-driving force control means which is capable of controlling braking-driving forces of left and right wheels independently to each other and the control means calculates a compensation yaw moment for reducing the influence of limiting the controlled variable of said steerable wheel turning means on a turn yaw moment of the vehicle when a predetermined limiting condition is established and modifies the braking-driving forces of the left and right wheels so that the compensation yaw moment is generated by the differences in braking-driving force between the left and right wheels.

According to this configuration, a compensation yaw moment for reducing the influence of limiting the controlled variable of the steerable wheel turning means on a turn yaw moment of the vehicle is calculated and the braking-driving forces of the left and right wheels are modified so that the compensation yaw moment is generated by the differences in braking-driving force between the left and right wheels. Accordingly, the influence of limiting the controlled variable of the steerable wheel turning means on a turn yaw moment of the vehicle can be reduced by the compensation yaw moment generated by the differences in braking-driving force between the left and right wheels.

The above-mentioned configuration may be such that: even when the predetermined limiting condition is established, the control means does not modify the braking-driving forces of the left and right wheels to generate the compensation yaw moment under the situation where a vehicle speed is not more than a reference value.

In general, a turning responsiveness of a vehicle to steering operation of a driver is low when a vehicle speed is low as compared with the case where a vehicle speed is high. Accordingly, the necessity of compensation for a drop in turning responsiveness of a vehicle resulting from limiting the controlled variable of the steerable wheel turning unit is low when a vehicle speed is low as compared with the case where a vehicle speed is high and the effect of modifying braking-driving forces of the left and right wheels is as well low.

According to this configuration, even when the predetermined limiting condition is established, the braking-driving forces of the left and right wheels are not modified to generate the compensation yaw moment under the situation where a vehicle speed is not more than a reference value. Accordingly, unnecessary modification of the braking-driving forces of the left and right wheels can positively be prevented from being performed which has a little effect to suppress a drop in turning responsiveness of a vehicle when a vehicle speed is not more than a reference value, and an increase in energy consumption caused by unnecessary modification of the braking-driving forces of the left and right wheels can positively be prevented.

The above-mentioned configuration may be such that: the steerable wheels are left and right front wheels; the steering assist force generating means is a rear wheel turning means which is capable of supplementarily turning left and right rear wheels to steer; and the control means calculates a modification amount of the steered angle of the left and right rear wheels for reducing the influence of limiting the controlled variable of the steerable wheel turning means on a turn yaw moment of the vehicle when a predetermined limiting condition is established and modifies a target steered angle of the left and right rear wheels with the modification amount.

According to this configuration, when a predetermined limiting condition is established, a modification amount of the steered angle of the left and right rear wheels is calculated which is for reducing the influence of limiting the controlled variable of the steerable wheel turning means on a turn yaw moment of the vehicle and a target steered angle of the left and right rear wheels is modified with the modification amount. Accordingly, the target steered angle of the left and right rear wheels can positively be modified so as to reduce the influence of limiting the controlled variable of the steerable wheel turning means on a turn yaw moment of the vehicle.

The above-mentioned configuration may be such that: the control means calculates a modification amount for turning the left and right rear wheels in a direction opposite to that of the left and right front wheels when the steered angle of the left and right rear wheels is not in-phase with that of the left and right front wheels under the situation where the predetermined limiting condition is established and urgent steering for avoiding danger is conducted by a driver.

According to this configuration, a modification amount is calculated which is for turning the left and right rear wheels in a direction opposite to that of the left and right front wheels when the steered angle of the left and right rear wheels is not in-phase with that of the left and right front wheels under the situation where the predetermined limiting condition is established and urgent steering for avoiding danger is conducted by a driver. Accordingly, the left and right rear wheels can be turned in a direction opposite to that of the left and right front wheels, to thereby increase the turn assist yaw moment in magnitude by turn lateral forces of the left and right rear wheels, which enables to positively reduce the influence of limiting the controlled variable of the steerable wheel turning means on a turn yaw moment of the vehicle.

The above-mentioned configuration may be such that: the control means calculates a modification amount for turning the left and right rear wheels in a direction that reduces the magnitude of the steered angle of the left and right rear wheels when the steered angle of the left and right rear wheels is in-phase with that of the left and right front wheels under the situation where the predetermined limiting condition is established and urgent steering for avoiding danger is conducted by a driver.

According to this configuration, a modification amount is calculated which is for turning the left and right rear wheels in a direction that reduces the magnitude of the steered angle of the left and right rear wheels when the steered angle of the left and right rear wheels is in-phase with that of the left and right front wheels under the situation where the predetermined limiting condition is established and urgent steering for avoiding danger is conducted by a driver. Accordingly, the left and right rear wheels can be turned in a direction that reduces the magnitude of the steered angle of the left and right rear wheels, to thereby reduce the turn resistive yaw moment in magnitude by turn lateral forces of the left and right rear wheels, which enables to positively reduce the influence of limiting the controlled variable of the steerable wheel turning means on a turn yaw moment of the vehicle.

The above-mentioned configuration may be such that: under the situation where the predetermined limiting condition is established and urgent steering for avoiding danger is not conducted by a driver, the control means calculates a modification amount of the steered angle of the left and right rear wheels for conforming the ratio between the modified target steered angle of the left and right rear wheels and the limited target steered angle of the left and right front wheels to the ratio between the target steered angle of the left and right rear wheels and the target steered angle of the left and right front wheels in a normal state where the predetermined limiting condition is not established.

According to this configuration, under the situation where the predetermined limiting condition is established and urgent steering for avoiding danger is not conducted by a driver, a modification amount of the steered angle of the left and right rear wheels is calculated for conforming the ratio between the modified target steered angle of the left and right rear wheels and the limited target steered angle of the left and right front wheels to the ratio between the target steered angle of the left and right rear wheels and the target steered angle of the left and right front wheels in a normal state where the predetermined limiting condition is not established, and the steered angle of the left and right rear wheels is modified with the modification amount.

Accordingly, under the situation where the predetermined limiting condition is established and urgent steering for avoiding danger is not conducted by a driver, that is, the situation where the necessity is low to reduce the influence of limiting the controlled variable of the steerable wheel turning means on a turn yaw moment of the vehicle, a driver can effectively be prevented from feeling odd due to the ratio between the steered angle of the left and right rear wheels and the steered angle of the left and right front wheels being made different by the limitation of the controlled variable of the steerable wheel turning unit from that in the situation where the predetermined limiting condition is not established.

The above-mentioned configuration may be such that: the steerable wheels are left and right front wheels; the steering assist force generating means includes a braking-driving force control means which is capable of controlling braking-driving forces of left and right wheels independently to each other and a rear wheel turning means which is capable of supplementarily turning left and right rear wheels to steer; and the control means places priority on the alteration of the controlled variable of the rear wheel turning means over the alteration of the controlled variable of the braking-driving force control means on the occasion of altering the controlled variables to reduce the influence of limiting the controlled variable of the steerable wheel turning means on a turn yaw moment of the vehicle.

According to this configuration, priority is placed on the alteration of the controlled variable of the rear wheel turning means over the alteration of the controlled variable of the braking-driving force control means on the occasion of altering the controlled variables to reduce the influence of limiting the controlled variable of the steerable wheel turning means on a turn yaw moment of the vehicle. Accordingly, as compared with the case where priority is placed on the alteration of the controlled variable of the braking-driving force control means over the alteration of the controlled variable of the rear wheel turning means, a possibility can more positively be reduced that occupants in a vehicle feel odd due to the change of a front-rear force of the entire vehicle.

The above-mentioned configuration may be such that: the rear wheel turning means includes an electric drive means which drivingly turns the left and right rear wheels to steer; the drive means is configured to be controlled to operate but not to be activated by forces which the rear wheels receive from road surface; the control means do not activate the drive means when the target steered angle of the left and right rear wheels is greater in magnitude than a reference steered angle.

According to this configuration, when the target steered angle of the left and right rear wheels is greater in magnitude than a reference steered angle, the drive means is not activated. Accordingly, travel stability of the vehicle can positively be prevented from decreasing due to the excess in magnitude of the steered angle of the left and right rear wheels. The drive means is configured to be controlled to operate but not to be activated by forces which the rear wheels receive from road surface. Accordingly, the travel stability can positively be prevented from decreasing due to the change in magnitude of the steered angle of the left and right rear wheels caused by forces which the rear wheels receive from road surface. Further, energy consumption by the rear wheel turning means can positively be reduced as compared with the case where the left and right wheels are turned to a rage greater in magnitude than a reference steered angle.

The above-mentioned configuration may be such that: the control means executes a control to generate the compensation yaw moment solely by turning the rear wheels by the rear wheel turning means when the compensation yaw moment is not more in magnitude than a yaw moment which can be generated by means of the turning of the rear wheels and, while on the other hand, executes a control to generate the compensation yaw moment by means of the turning of the rear wheels by the rear wheels turning means and the control of the differences in braking-driving force between the left and right wheels by the braking-driving force control means when the compensation yaw moment is more in magnitude than a yaw moment which can be generated by turning the rear wheels.

According to this configuration, the alteration amount of the controlled variable of the rear wheels turning means can be made greater than the alteration amount of the controlled variable of the braking-driving force control means on the occasion of altering the controlled variables to reduce the influence of limiting the controlled variable of the steerable wheel turning means on a turn yaw moment of the vehicle, which enables to positively place priority on the alteration of the controlled variable of the rear wheels turning means over the alteration of the controlled variable of the braking-driving force control means.

The above-mentioned configuration may be such that: the control means places priority on the alteration of the controlled variable of the rear wheel turning means over the alteration of the controlled variable of the braking-driving force control means by initiating the alteration of the controlled variable of the rear wheel turning means earlier than the alteration of the controlled variable of the braking-driving force control means.

According to this configuration, the alteration of the controlled variable of the rear wheel turning means can be initiated earlier than the alteration of the controlled variable of the braking-driving force control means on the occasion of altering the controlled variables to reduce the influence of limiting the controlled variable of the steerable wheel turning means on a turn yaw moment of the vehicle, which enables to positively place priority on the alteration of the controlled variable of the rear wheel turning means over the alteration of the controlled variable of the braking-driving force control means.

The above-mentioned configuration may be such that: the steerable wheel turning means is a steering ratio varying means which varies the ratio of the magnitude of steered angle varying motion of the steerable wheels relative to the magnitude of steering operation of a driver by driving an output member relative to an input member driven by a steering operation of a driver.

The above-mentioned configuration may be such that: the steerable wheel turning means is a steerable wheel turning means of steer-by-wire type which has an input member driven by a steering operation of a driver and a drive means for drivingly turning steerable wheels to steer, and is capable of turning the steerable wheels by the drive means without depending on the steering operation of the input member by a driver.

The above-mentioned configuration may be such that: the control means calculates a modification value of the controlled variable of the turn assist yaw moment generating means for reducing the influence of limiting the controlled variable of the steerable wheel turning means on a turn yaw moment of the vehicle, and modifies the controlled variable of the turn assist yaw moment generating means with the modification value.

The above-mentioned configuration may be such that: the limit value is a correction value for decreasing the wheel-turning controlled variable and the wheel-turning controlled variable limiting means decreasingly correct the magnitude of the wheel-turning controlled variable with the correction value.

The above-mentioned configuration may be such that: limit value is an upper limit in magnitude of the wheel-turning controlled variable and the wheel-turning controlled variable limiting means limits the magnitude of the wheel-turning controlled variable with the upper limit such that the magnitude of the wheel-turning controlled variable does not exceed the upper limit.

The above-mentioned configuration may be such that: the control means calculates the difference in braking-driving force between the left and right wheels of the entire vehicle for generating the compensation yaw moment; calculates a target difference in braking-driving force between the left and right front wheels and a target difference in braking-driving force between the left and right rear wheels by allocating the difference in braking-driving force between the left and right wheels of the entire vehicle to the front and rear wheels; and controls braking-driving forces of the left and right front wheels on the basis of the target difference in braking-driving force between the left and right front wheels and braking-driving forces of the left and right rear wheels on the basis of the target difference in braking-driving force between the left and right rear wheels.

In the above-mentioned configuration the braking-driving force(s) may be braking force(s).

The above-mentioned configuration may be such that: the control means limit the magnitude of the steered angle of the left and right rear wheels so as not to exceed a predetermined maximum value.

The above-mentioned configuration may be such that: the control means determines whether or not urgent steering for avoiding danger is conducted by a driver by determining whether or not the magnitude of the steering velocity is not less than a criterion which is set in accordance with a vehicle speed.

The above-mentioned configuration may be such that: the control means shifts the timing of controlling the steered angle of the rear wheels from the timing of controlling the steered angle of the front wheels.

The above-mentioned configuration may be such that: the drive means has an electric motor, a turning means for turning the rear wheels to steer and a motion transfer means, and the motion transfer means transfers the rotation of the electric motor to the motion of the turning means for turning the rear wheels but does not transfer the motion of the turning means for turning the rear wheels to the rotation of the electric motor.

BEST MODE FOR CARRYING OUT THE INVENTION

Several preferred embodiments of the present invention will now be described in detail with reference to the accompanying drawings.

First Embodiment

Figure 1:
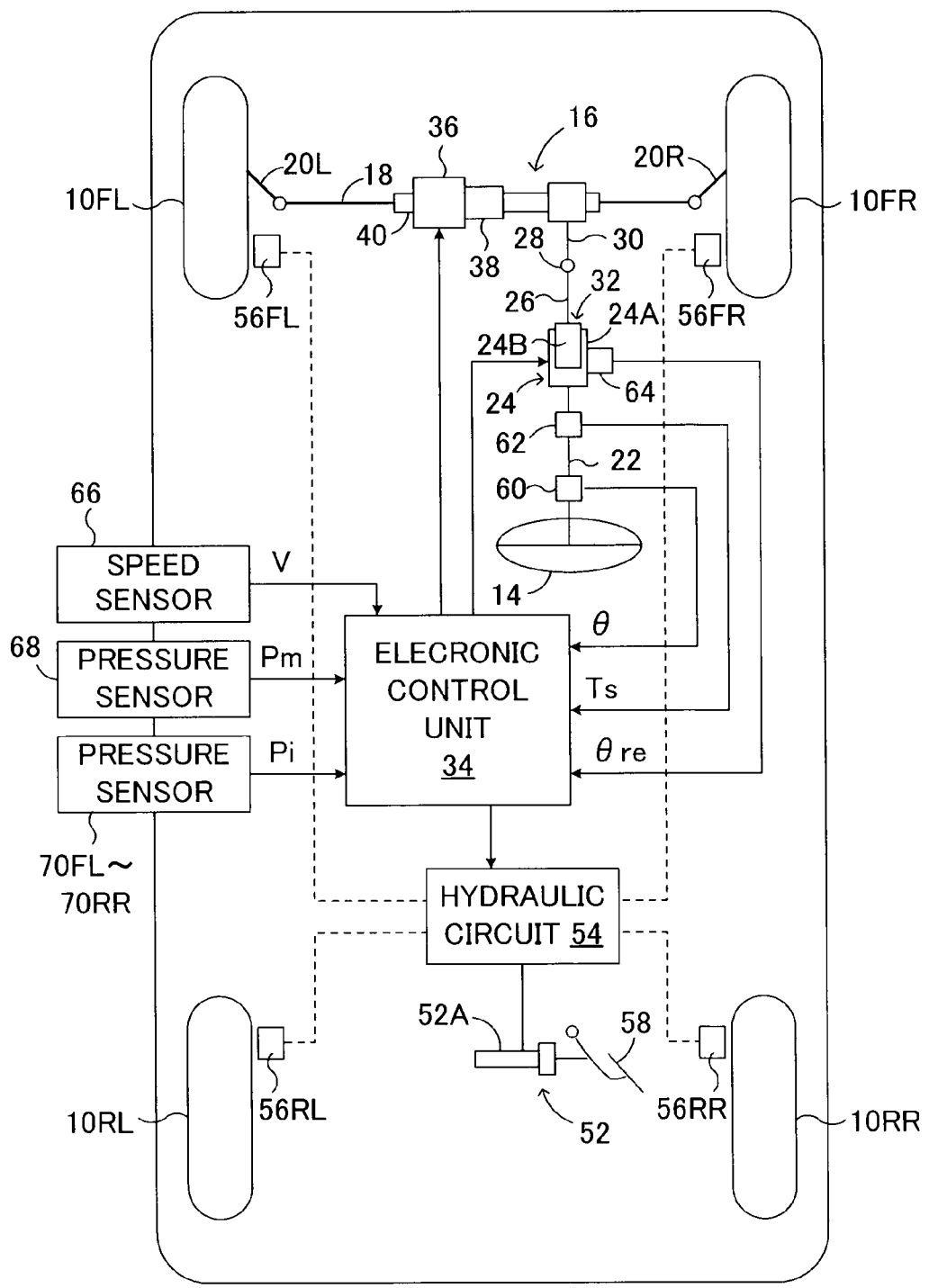
FIG. 1 is a schematic configurational view showing a first embodiment of a vehicle travel control device according to the present invention which is applied to a vehicle in which a steered angle of front wheels can be controlled.

FIG. 1 is a schematic configurational view showing a first embodiment of a vehicle travel control device according to the present invention which is applied to a vehicle in which a steered angle of front wheels can be controlled.

In FIG. 1, reference numerals 10FL and 10FR respectively denote left and right front wheels, which are steerable wheels of a vehicle 12; and 10RL and 10RR respectively denote left and right rear wheels. The left and right front wheels 10FL and 10FR, which are the steered wheels, are steered by a rack and pinion type electric power steering unit 16 via a rack bar 18, and tie rods 20L and 20R. The electric power steering unit 16 is driven in response to an operation of a steering wheel 14 by a driver.

The steering wheel 14 is drivingly connected to a pinion shaft 30 of the electric power steering unit 16 via an upper steering shaft 22, a steered angle varying unit 24, a lower steering shaft 26, and a universal joint 28. In the exemplary embodiment shown in the figure, the steered angle varying unit 24 includes an electric motor 32 for supplementary steering driving. The electric motor 32 has a housing 24A linked to a lower end of the upper steering shaft 22 and a rotor 24B linked to an upper end of the lower steering shaft 26.

As is apparent from the above, the steered angle varying unit 24 serves as a steered angle ratio varying unit or an automatic steering unit which rotates the lower steering shaft 26 relative to the upper steering shaft 22 so as to drive, for supplementary steering, the left and right front wheels 10FL and 10FR relative to the steering wheel 14 for achieving a steering gear ratio control and a vehicle travel control. The steered angle varying unit 24 is controlled by a steered angle control section of an electronic control unit 34.

It is to be noted that when the steered angle varying unit 24 suffers from a trouble which renders the unit unable to rotate the lower steering shaft 26 relative to the upper steering shaft 22, a lock mechanism, not shown in FIG. 1, is automatically activated to prevent mechanically the housing 24A and the rotor 24B from rotating relative to each other so as to inhibit rotation of the lower steering shaft 26 relative to the upper steering shaft 22.

In the first embodiment, the electric power steering unit 16 is located concentric with the rack bar. The electric power steering unit 16 includes an electric motor 36 and a mechanism that converts the rotational torque of the electric motor 36 into a force in a reciprocating direction of the rack bar 18 such as, for example, a ball-screw type converting mechanism 38. The electric power steering unit 16 is controlled by an electric power steering system (EPS) control section of an electronic control unit 34. The electric power steering unit 16 serves as a steering assist force generating unit which reduces the steering load on the driver by generating a steering assist force to drive the rack bar 18 relative to a housing 40. The steering assist force generating means may be of any configuration known in the art.

Braking forces of the individual wheels are controlled through the control of pressures Pi (i=fl, fr, rl, rr) in wheel cylinders 56FL, 56FR, 56RL, and 56RR, i.e. braking pressures, performed by a hydraulic circuit 54 of a baking apparatus 52. Although not illustrated, the hydraulic circuit 54 includes a reservoir, an oil pump, various valve devices, etc. In an ordinary state, the braking pressures in the individual wheel cylinders are controlled by a braking force control section of the electronic control unit 34 in accordance with the pressure Pm of a master cylinder 52A which is operated by the depression of a brake pedal 58 by a driver.

In the embodiment shown in the figure, the upper steering shaft 22 is provided with a steering angle sensor 60 which detects a rotational angle of the upper steering shaft 22 as a steering angle θ and a steering torque sensor 62 which detects a steering torque Ts. Signals indicative of a steering angle θ and a steering torque Ts are input to the electronic control unit 34.

The electronic control unit 34 receives a signal indicative of a relative rotation angle θre of the steered angle varying unit 24 detected by a rotation angle sensor 64, which is a rotation angle of the lower steering shaft 26 relative to the upper steering shaft 22. The electronic control unit 34 further receives a signal indicative of a vehicle speed V detected by a vehicle speed sensor 66, a signal indicative of the master cylinder pressure Pm detected by a pressure sensor 68, and signals indicative of the braking pressures Pi of the individual wheels detected by pressure sensors 70FL-70RR.

The individual sections of the electronic control unit 34 may be those which comprise microcomputers and each microcomputer may have a CPU, ROM, RAM, and an input/output port connected with one another via a bidirectional common bus. The steering angle sensor 60, the steering torque sensor 62 and the rotation angle sensor 64 detect a steering angle θ, a steering torque Ts and a relative rotation angle θre, respectively with the detected variables being positive when steering or wheel turning is conducted in left turning direction of a vehicle.

As will be described in detail hereinafter, the electronic control unit 34 calculates a target steering gear ratio Rgt for achieving a predetermined steering characteristic on the basis of a vehicle speed V in a normal state where a controlled variable of the steered angle varying unit 24 is not limited. The electronic control unit 34 calculates a target steered angle δnft of the front wheels in a normal state on the basis of a target steering gear ratio Rgt and a steering angle θ; sets a target steered angle δft of the front wheels to a target steered angle θnft of the front wheels in normal state; and controls the steered angle varying unit 24 so that a steered angle δf the front wheels conforms to a target steered angle δft.

In addition, the electronic control unit 34 calculates basic target braking pressures Pbti (i=fl, fr, rl, rr) of the individual wheels on the basis of the master cylinder pressure Pm which indicates braking operation amount of a driver; sets target braking pressures Pti (i=fl, fr, rl, rr) to the basic target braking pressures Pbti in a normal state where a controlled variable of the steered angle varying unit 24 is not limited; and controls the braking pressures Pi (i=fl, fr, rl, rr) of the individual wheels so that braking forces of the individual wheels conform to the forces corresponding to the associated target braking pressures Pti.

Furthermore, the electronic control unit 34 calculates a target assist torque Ta for generating a steering assist torque to reduce the steering load on the driver on the basis of a steering torque Ts and a vehicle speed V in a manner known in the art and achieves a power assist control by controlling the electric power steering unit 16 so that an assist torque conforms to the target assist torque Ta.

It is to be noted that the above-described steering assist control, steered angle control of the rear wheels, steered angle control of the front wheels in a normal state, braking force control in a normal state per se do not constitute a major part of the present invention and these controls can be executed in any manners known in the art.

On the other hand, the electronic control unit 34 calculates a modification value Δδft of the target steered angle δft of the front wheels to limit the controlled variable of the steered angle varying unit 24 in a state where a predetermined limit condition is established; sets the target steered angle δft of the front wheels to the target steered angle δnft of the front wheels in a normal state modified with the modification value Δδft; and controls the steered angle varying unit 24 so that a steered angle δf the front wheels conforms to a target steered angle δft.

In addition, in a state where the controlled variable of the steered angle varying unit 24 is limited and the target steered angle δft is modified with the modification value Δδft, the electronic control unit 34 calculates a compensation yaw moment Mcmp for reducing the influence of the limitation of the controlled variable of the steered angle varying unit 24 on a steering yaw moment of the vehicle on the basis of the unlimited controlled variable and the limited controlled variable of the steered angle varying unit 24. The electronic control unit 34 further calculates modification values ΔPti of the target braking pressures of the individual wheels for generating the compensation yaw moment Mcmp by means of the braking force differences between left and right wheels and controls the braking pressures Pi (i=fl, fr, rl, rr) of the individual wheels in accordance with target braking pressures Pti which are basic target braking pressures Pbti modified with the modification values ΔPti.

Figure 2:
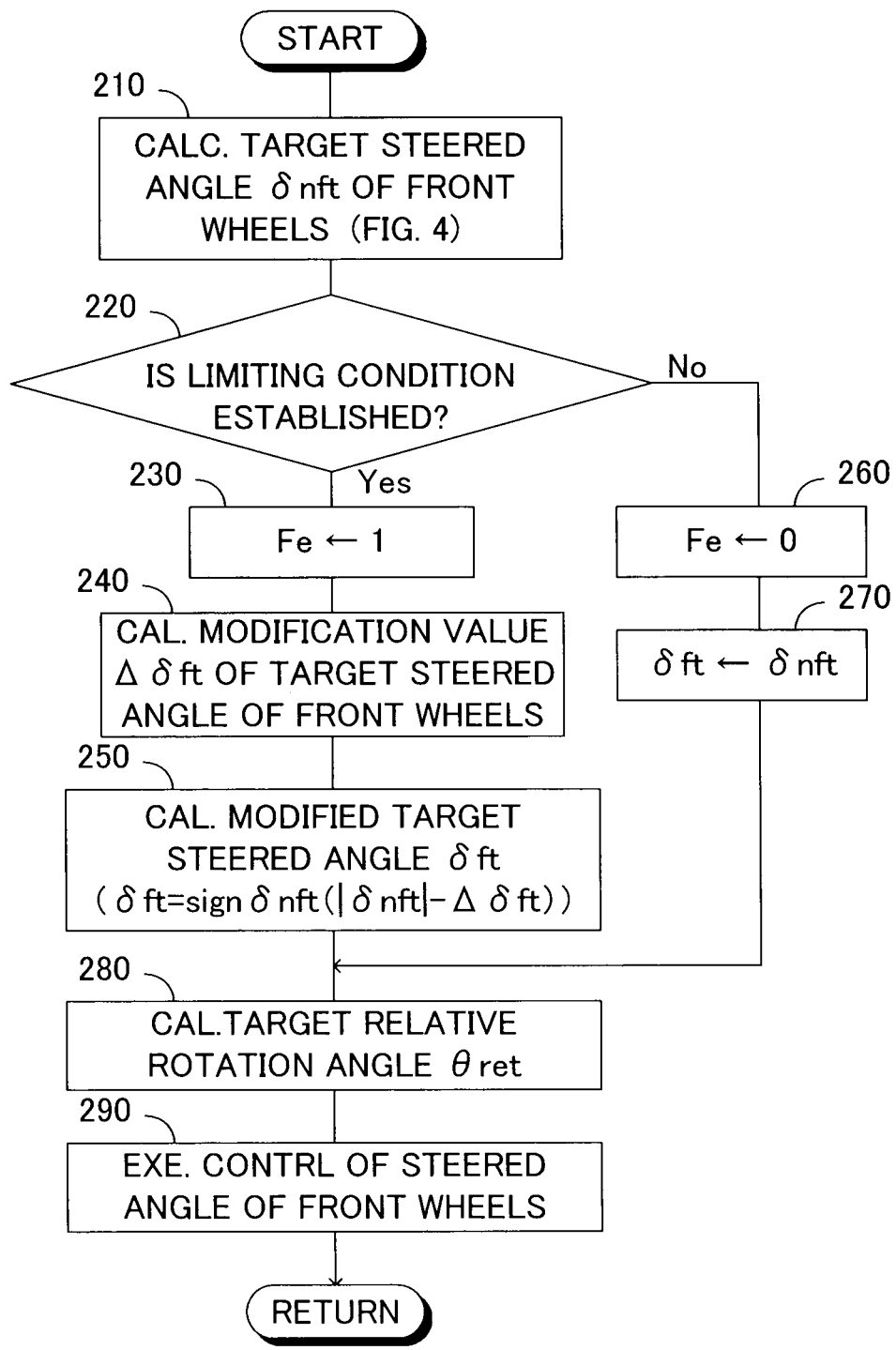
FIG. 2 is a flowchart showing the routine for controlling a steered angle of the front wheels in the first embodiment.
Figure 3:
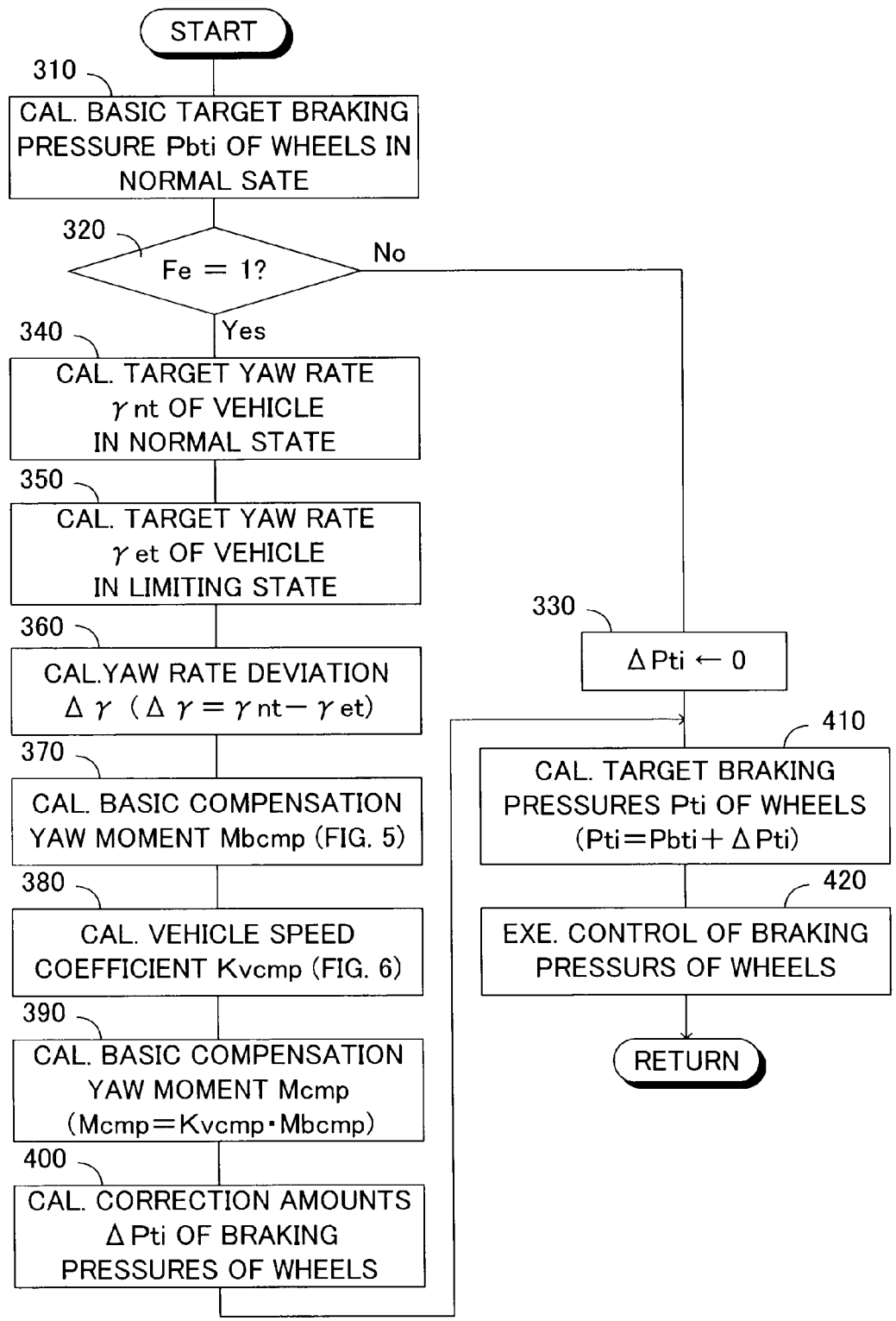
FIG. 3 is a flowchart showing the routine for controlling braking forces in the first embodiment.

Next, the vehicle travel control in the illustrated first embodiment will be described with reference to the flowchart shown in FIGS. 2 and 3. Notably, FIGS. 2 and 3 are the flowcharts which show the routine for controlling a steered angle of the front wheels and the routine for controlling braking forces, respectively. The controls are started when an ignition switch not shown in the figure is turned on, and are repeatedly executed at predetermined intervals.

Figure 4:
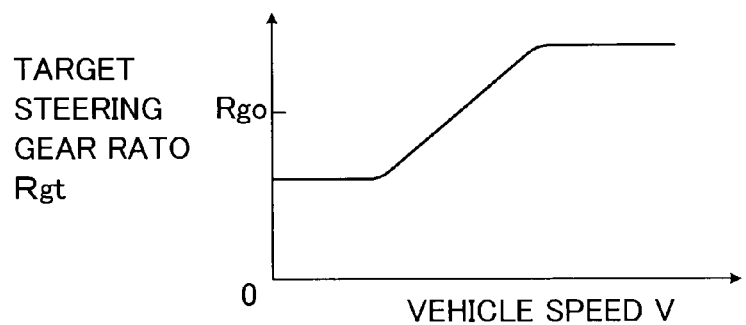
FIG. 4 is a graph showing the relation between a vehicle speed V and a target steering gear ratio Rgt.

In step 210 of the routine for controlling steered angle of the front wheels, a target steering gear ratio Rgt is calculated from a map corresponding to the graph shown in FIG. 4 on the basis of a vehicle speed V and a target steered angle δnft of the front wheels in a normal state for achieving a predetermined steering characteristic is calculated according to the following equation 1.

$$\delta nft = \theta / Rgt \tag{1}$$

It is to be noted that with a normal steering gear ratio being denoted by Rgo (a positive constant), the target steered angle θnft is a sum of a steered angle δw (=θ/Rgo) corresponding to steering operation of a driver and controlled steered angle δc for achieving a predetermined steering characteristic. The control of steering characteristic per se does not constitute a major part of the present invention. A target steering gear ratio Rgt may be calculated in any manner known in the art and for example, may be varied in accordance with a steering velocity so as to enhance a transient response of a vehicle to steering operation.

In step 220, a decision is made as to whether or not a predetermined limiting condition is established for a controlled variable of the steered angle varying unit 24, i.e. whether or not the situation is in the state where the magnitude of a target steered angle of the front wheels is to be decreasingly modified. When a negative decision is made, the control proceeds to step 260, and when an affirmative decision is made, the control proceeds to step 230. It is to be understood that the limiting condition for a controlled variable of the steered angle varying unit 24 does not constitute a major part of the present invention and may be any condition which requires to limit a controlled variable of the steered angle varying unit 24 for ensuring the operation of the other units such as the electric power steering unit 16 or the steered angle varying unit 24 per se.

In step 230, a flag Fe is set to 1 so as to indicate that the limiting condition is established for a controlled variable of the steered angle varying unit 24. In step 240, a modification value Δδft of the target steered angle δft of the front wheels to limit the controlled variable of the steered angle varying unit 24 is calculated. It is to be understood that the calculation of a modification value Δδft does not constitute a major part of the present invention and the modification value may be calculated in a manner as described in the above-mentioned Japanese Patent Application Laid-Open (kokai) No. 2006-131141 or in a manner as described in the specification and drawings of Japanese Patent Application No. 2007-299482 filed on the same day as Japanese Patent Application No. 2007-299488 on which the present application claims the Convention priority.

In step 250, a modified target steered angle δft of the front wheels is calculated according to the under-described equation 2 wherein signδnft denotes the sign of a target steered angle δft of the front wheels.

$$\delta ft = sign\delta nft(|\delta nft| - \Delta\delta ft) \tag{2}$$

In step 260, the flag Fe is reset to 0 so as to indicate that the limiting condition is not established for a controlled variable of the steered angle varying unit 24. In step 270, the modified target steered angle δft of the front wheels is set to the target steered angle δnft of the front wheels in a normal state.

In step 280, a target relative rotation angle θret of the steered angle varying unit 24 for conforming the steered angle δf the front wheels to the modified target steered angle δft of the front wheels is calculated on the basis of the modified target steered angle δft of the front wheels in a manner known in the art. In step 290, the steered angle varying unit 24 is controlled so that the relative rotation angle θre of the steered angle varying unit 24 conforms to the target relative rotation angle θret and accordingly the steered angle δf the front wheels conforms to the modified target steered angle δft.

In step 310 of the routine for controlling the braking forces shown in FIG. 3, basic target braking pressures Pbti (i=fl, fr, rl, rr) of the individual wheels in a normal state are calculated by multiplying positive coefficient Kbi of the individual wheels and a master cylinder pressure Pm.

In step 320, a decision is made as to whether or not the flag Fe is 1, i.e. whether or not the limiting condition is established for a controlled variable of the steered angle varying unit 24. When a negative decision is made, the control proceeds to step 410 after modification amounts ΔPti of the braking pressures of the individual wheels are set to 0 in step 330, and when an affirmative decision is made, the control proceeds to step 340.

In step 340, a target yaw rate γnt of the vehicle in a normal state is calculated on the basis of the target steered angle δnft of the front wheels in a normal state calculated in step 210 in the flowchart shown in FIG. 2 and a vehicle speed V in a manner known in the art.

In step 350, a target yaw rate γet of the vehicle in a controlled variable limiting state is calculated on the basis of the modified target steered angle δft of the front wheels calculated in step 250 in the flowchart shown in FIG. 2 and a vehicle speed V in a manner known in the art.

In step 360, a difference between the target yaw rate γnt of the vehicle in a normal state and the target yaw rate γet of the vehicle in a controlled variable limiting state is calculated as a yaw rate deviation Δγ which denotes a lowering amount of a target yaw rate of the vehicle due to the limitation of the controlled variable.

Figure 5:
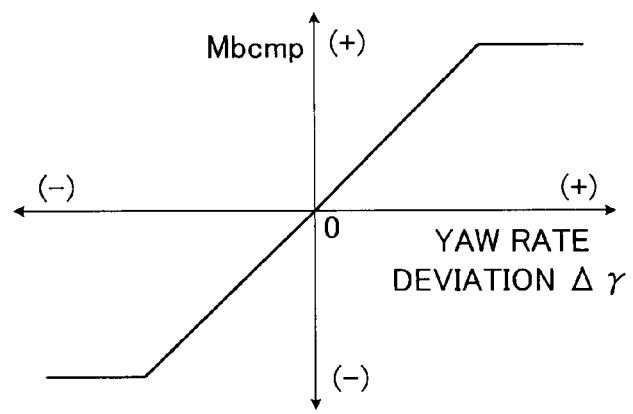
FIG. 5 is a graph showing the relation between a yaw rate deviation Δγ and a basic compensation yaw moment Mbcmp.

In step 370, a basic compensation yaw moment Mbcmp for reducing the influence of limiting the controlled variable of the steered angle varying unit 24 on a turn yaw moment of the vehicle is calculated from a map corresponding to the graph shown in FIG. 5 on the basis of the yaw rate deviation Δγ. In this connection, the basic compensation yaw moment Mbcmp is calculated to be greater as the yaw rate deviation Δγ increases in magnitude.

Figure 6:
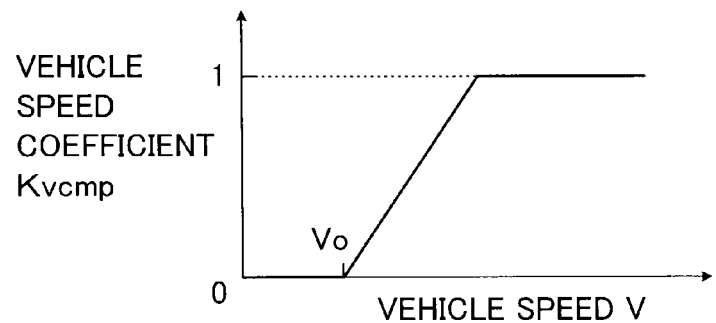
FIG. 6 is a graph showing the relation between a vehicle speed V and a vehicle speed coefficient Kvcmp.

In step 380, a vehicle speed coefficient Kvcmp is calculated from a map corresponding to the graph shown in FIG. 6 on the basis of the vehicle speed V. In this connection, the vehicle speed coefficient Kvcmp is calculated to be smaller as the vehicle speed V lowers and to be zero when the vehicle speed V is not more than a positive reference value Vo corresponding to a lower vehicle speed.

In step 390, a compensation yaw moment Mcmp for reducing the influence of limiting the controlled variable of the steered angle varying unit 24 on a steering yaw moment of the vehicle is calculated to be a product of the vehicle speed coefficient Kvcmp and the basic compensation yaw moment Mbcmp.

In step 400, a braking force difference ΔFb between the left and right wheels of the entire vehicle is calculated, and on the basis of the braking force difference ΔFb between the left and right wheels of the entire vehicle and a front wheel allocation ratio Kbf (which is greater than 0 and smaller than 1), a braking force difference ΔFbf (=(1−Kbf)·ΔFb) between the left and right front wheels and a braking force difference ΔFbr (=(1−Kbf)·ΔFb) between the left and right rear wheels are calculated.

Based on a direction of vehicle turning by the compensation yaw moment Mcmp, a correction amount ΔFbti of braking force of a front inner wheel is set to ΔFbf; a correction amount ΔFbti of braking force of a rear inner wheel is set to ΔFbr; and correction amounts ΔFbti of braking forces of the other wheels are set to 0. Further, correction amounts ΔPti (i=fl, fr, rl, rr) of the target braking pressures of the individual wheels are calculated on the basis of the correction amount ΔFbti of braking forces of the individual wheels.

In step 410, the target braking pressures Pti (i=fl, fr, rl, rr) are calculated to be a sum of the basic braking pressures Pbti and the correction amounts ΔPti and in step 420, the braking pressures Pi of the individual wheels are controlled so that they conforms to the associated target braking pressures Pti to thereby control the braking forces of the individual wheels to be braking forces corresponding to the associated target braking pressures Pti.

Thus, according to the first embodiment, when the limiting condition is not established for a controlled variable of the steered angle varying unit 24, a negative decision is made in step 220 of the flowchart shown in FIG. 2 and the steered angle varying unit 24 is controlled so that the steered angle of the front wheels conforms to the target steered angle δft of the front wheels which is set to the target steered angle δnft of the front wheels in a normal state. A negative decision is also made in step 320 of the flowchart shown in FIG. 3 and the braking forces of the individual wheels are controlled in steps 330, 410 and 420 on the basis of the target braking pressures Pti which are set to the basic target braking pressures Pbti of the individual wheels in a normal state.

To the contrary, when the limiting condition is established for a controlled variable of the steered angle varying unit 24, a positive decision is made in step 220 of the flowchart shown in FIG. 2 and the flag Fe is set to 1 in step 230. In steps 240 and 250, the modified target steered angle δft of the front wheels is calculated for limiting the controlled variable of the steered angle varying unit 24. In steps 280 and 290, the steered angle varying unit 24 is controlled so that the steered angle of the front wheels conforms to the modified target steered angle δft of the front wheels.

A positive decision is made in step 320 of the flowchart shown in FIG. 3. In steps 340-420, the compensation yaw moment Mcmp for reducing the influence of limiting the controlled variable of the steered angle varying unit 24 on a steering yaw moment of the vehicle is calculated and the braking forces of the individual wheels are controlled so that the compensation yaw moment Mcmp is generated by the braking force differences between the left and right wheels.

According to the first embodiment, therefore, the lowering in magnitude of a target yaw moment of the vehicle due to the limitation of the controlled variable of the steered angle varying unit 24 can be supplemented with the compensation yaw moment Mcmp generated by the braking force differences between the left and right wheels, which enables to effectively suppress deterioration of the vehicle in turning responsiveness to steering operation of a driver even in a state where the controlled variable of the steered angle varying unit 24 serving as a steerable wheel turning means is limited.

According to the first embodiment, in particular, in step 380 of the flowchart shown in FIG. 3, a vehicle speed coefficient Kvcmp is calculated so that the coefficient is smaller as a vehicle speed V decreases and is zero when a vehicle speed V is not more than the reference value Vo, and a compensation yaw moment Mcmp for reducing the influence of limiting the controlled variable of the steered angle varying unit 24 on a steering yaw moment of the vehicle is calculated to be the product of the basic compensation yaw moment Mbcmp and the vehicle speed coefficient Kvcmp.

Accordingly, since the modification is not performed on the braking-driving forces of the left and right wheels for generating a compensation yaw moment when a vehicle speed V is not more than the reference value Vo, it is possible to positively prevent unnecessary modification from being performed on the braking-driving forces of the left and right wheels which has a little effect on suppression of the deterioration of the vehicle in turning responsiveness when a vehicle speed is not more than the reference value and it is possible to securely prevent energy consumption from increasing due to unnecessary modification being performed on the braking-driving forces of the left and right wheels. It is to be understood that the above applies to the second embodiment to be described later.

Second Embodiment

Figure 7:
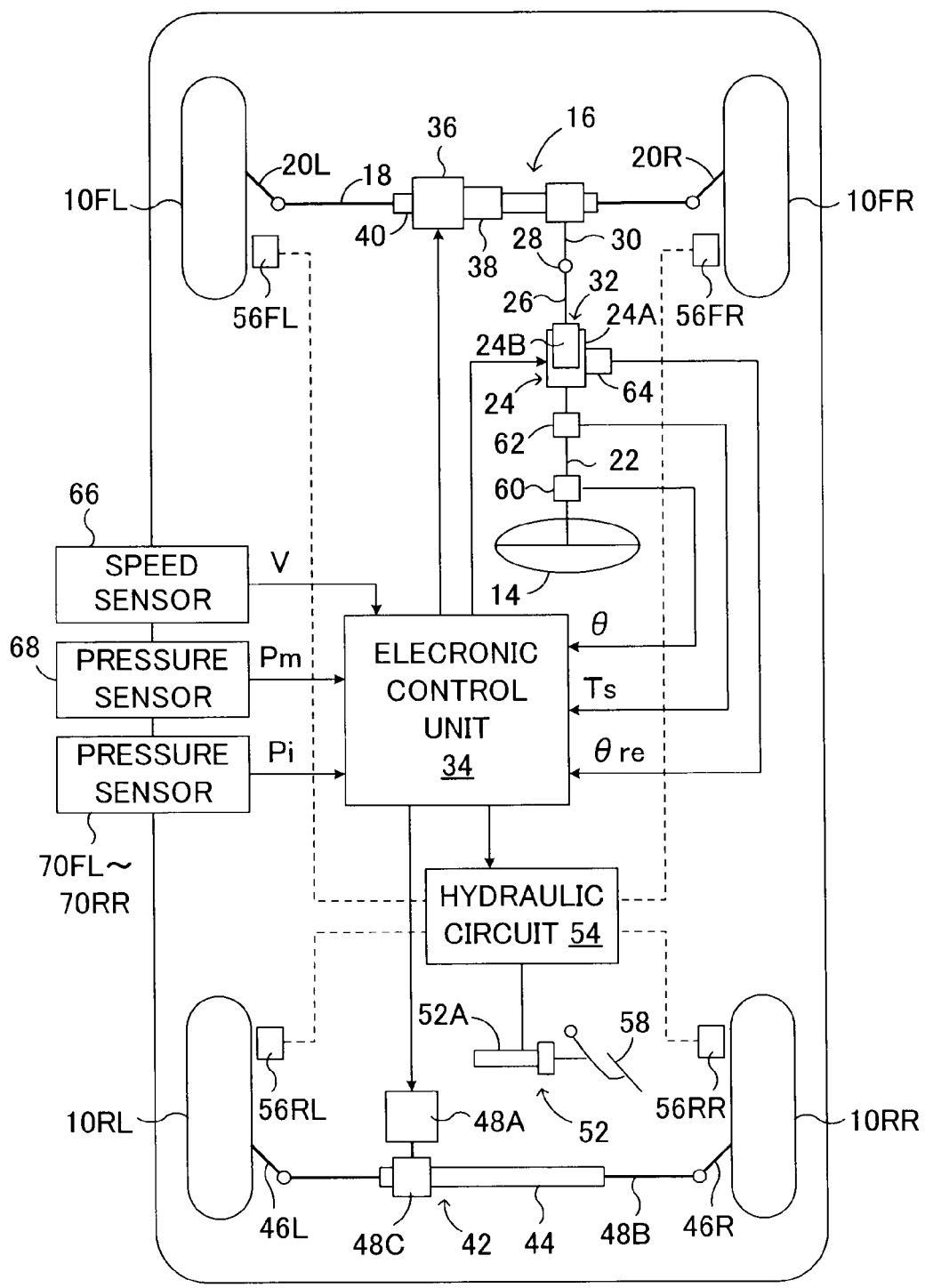
FIG. 7 is a schematic configurational view showing a second embodiment of a vehicle travel control device according to the present invention which is applied to a vehicle in which steered angles of front and rear wheels can be controlled.

FIG. 7 is a schematic configurational view showing a second embodiment of a vehicle travel control device according to the present invention which is applied to a vehicle in which steered angles of front and rear wheels can be controlled. Notably, in FIG. 7, members identical to those shown in FIG. 1 are denoted by the same reference numerals as used in FIG. 1.

In this second embodiment, the left and right rear wheels 10RL and 10RR are steered by an electric power steering unit 44 of a rear steering device 42 via tie rods 46L and 46R independently of steering of the front left and right wheels 10FL and 10FR, and the rear steering device 42 is controlled by the steering section of the electronic control unit 34.

The illustrated rear steering device 42 is an electric auxiliary steering device of well-known configuration, and has an electric motor 48A and a motion transfer mechanism 48C of screw type, for example, which transfers rotational motion of the electric motor 48A to reciprocal motion of a relay rod 48B. The relay rod 48B cooperates with the tie rods 46L and 46R and knuckle arms not illustrated in the figure to constitute a wheel turning mechanism which turns the left and right rear wheels 10RL and 10RR to steer by means of reciprocation of the relay rod 48B.

Although not shown in detail in the figure, the motion transfer mechanism 48C transfers rotational motion of the electric motor 48A to reciprocal motion of a relay rod 48B but does not transmit forces which the left and right rear wheels 10RL and 10RR receive from road surface to the electric motor 48A so that the electric motor 48A is not rotated by the force transmitted to the relay rod 48B.

The electronic control unit 34 in this second embodiment calculates a target steered angle δrt of the rear wheels in a manner known in the art on the basis of a steering angle $\theta$ and a vehicle speed V in a normal state. The electronic control unit 34 controls the rear steering device 42 so that a steered angle of the rear wheels conforms to the target steered angle $\delta$rt.

In this second embodiment, it is to be noted that the control of the steered angle of the front wheels is executed similarly to that in the above-described first embodiment according to the flowchart shown in FIG. 2. Also in this second embodiment, the braking forces of the individual wheels are controlled on the basis of the target braking pressures Pti of the individual wheels which are set to the basic target braking pressures Pbti of the individual wheels in a normal state.

Figure 8:
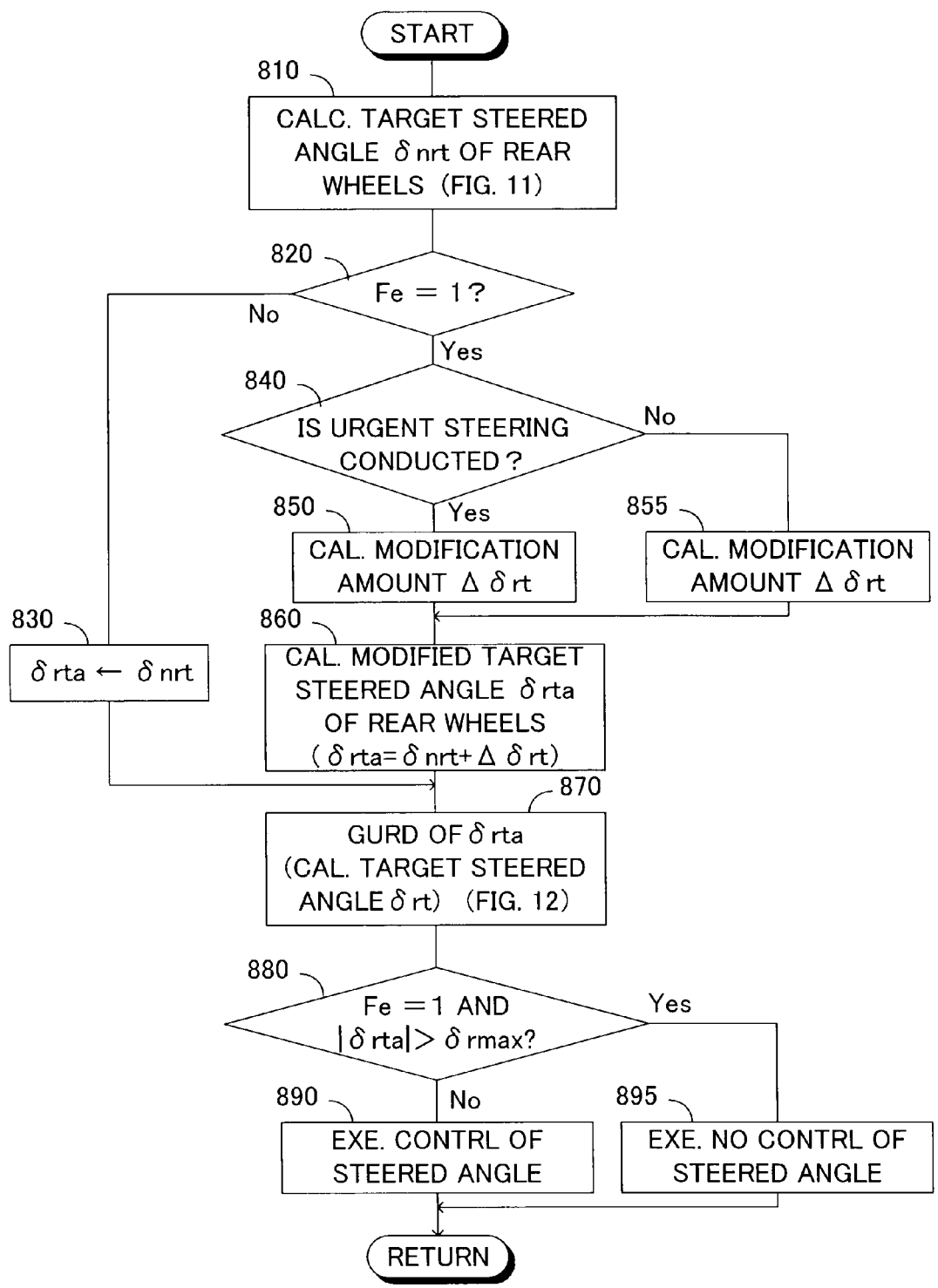
FIG. 8 is a flowchart showing the routine for controlling a steered angle of the rear wheels in the second embodiment.

Further in this second embodiment, a steered angle of the rear wheels is controlled according to the flowchart shown in FIG. 8. The control according to the flowchart shown in FIG. 8 is as well started when an ignition switch not shown in the figure is turned on, is repeatedly executed at predetermined intervals.

Figure 11:
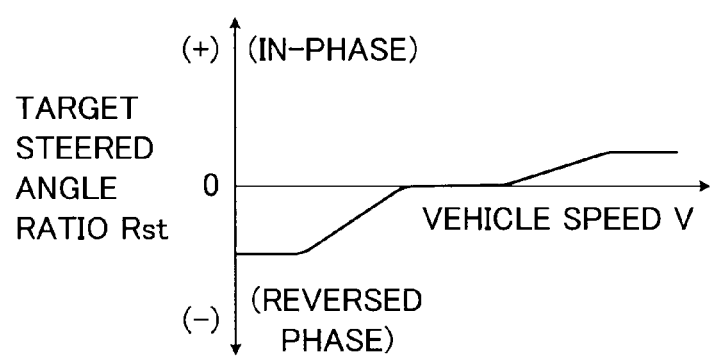
FIG. 11 is a graph showing the relation between a vehicle speed V and a target front-rear steered angle ratio Rst.

In step 810, a target steered angle ratio Rst between the front and rear wheels is calculated from a map corresponding to the graph shown in FIG. 11 on the basis of a vehicle speed V, and a target steered angle $\delta$nrt of the rear wheels in a normal state is calculated to be a product of the target steered angle ratio Rst and a steering angle $\theta$. It is to be noted that the calculation of the target steered angle $\delta$nrt of the rear wheels in a normal state per se does not constitute a major part of the present invention and it may be calculated in any manner known in the art. A steering angle velocity $\theta$d may for example be considered in addition to the target steered angle ratio Rst and a steering angle $\theta$.

In step 820, a decision is made as to whether or not the flag Fe is 1, i.e. whether or not the limiting condition is established for a controlled variable of the steered angle varying unit 24. When a negative decision is made, the control proceeds to step 870 after a modified target steered angle $\delta$rta of the rear wheels is set to the target steered angle $\delta$nrt of the rear wheels in a normal state in step 830, and when an affirmative decision is made, the control proceeds to step 840.

In step 840, a decision is made as to whether or not urgent steering for avoiding danger is conducted by a driver. When an affirmative decision is made, the control proceeds to step 850 whereas when a negative decision is made, the control proceeds to step 855. In this connection, the decision as to whether or not urgent steering for avoiding danger is conducted may be executed in any manner known in the art. For example, if the magnitude of steering angle velocity $\theta$d is found to be not less than a reference steering angle velocity, the decision that urgent steering for avoiding danger is being conducted may be made for a predetermined period of time thereafter.

In step 850, a decision is made as to whether or not the target steered angle $\delta$nrt of the rear wheels in a normal state is in-phase with the target steered angle $\delta$nft of the front wheels in a normal state calculated in step 210 of the flowchart shown in FIG. 2. When the target steered angle $\delta$nrt is not in-phase with the target steered angle $\delta$nft, a modification amount $\Delta\delta$rt for turning the rear wheels in the direction opposite to that of the front wheels is calculated on the basis of the modification amount $\Delta\delta$ft of the target steered angle of the front wheels calculated in step 240. To the contrary, when the target steered angle $\delta$nrt is in-phase with the target steered angle $\delta$nft, a modification amount $\Delta\delta$rt for turning the rear wheels in a direction that reduces the magnitude of the steered angle of the rear wheels is calculated on the basis of the modification amount $\Delta\delta$ft of the target steered angle of the front wheels calculated in step 240.

In step 855, a modification amount $\Delta\delta$rt of the steered angle of the rear wheels is calculated which is needed to conform the ratio between a modified target steered angle $\delta$rta of the rear wheels and the limited modified target steered angle $\delta$ft of the front wheels to the ratio between the target steered angle $\delta$nrt of the rear wheels and the target steered angle $\delta$nft of the front wheels in a normal state where the limiting condition is not established for a controlled variable of the steered angle varying unit 24.

Figure 12:
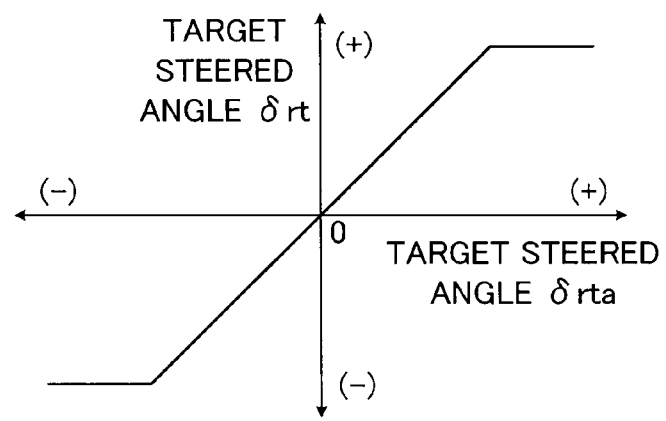
FIG. 12 is a graph showing the relation between a modified target steered angle δrta of the rear wheels and a target steered angle δrt of the rear wheels.

In step 860, a modified target steered angle $\delta$rta of the rear wheels is calculated to be the sum of the target steered angle $\delta$nrt of the rear wheels in a normal state and the modification amount $\Delta\delta$rt of the steered angle. In step 870, the modified target steered angle $\delta$rta of the rear wheels is guarded with an upper limit value $\delta$rmax so that a target steered angle $\delta$rt of the rear wheels does not exceed the upper limit value $\delta$rmax in magnitude. That is, a target steered angle $\delta$rt of the rear wheels is calculated from a map corresponding to the graph shown in FIG. 12 on the basis of the modified target steered angle $\delta$rta of the rear wheels.

In step 880, a decision is made as to whether or not the flag Fe is 1 and the absolute value of the modified target steered angle $\delta$rta of the rear wheels exceeds the upper limit value $\delta$rmax, i.e. whether or not the magnitude of the modified target steered angle $\delta$rta of the rear wheels exceeds the upper limit value $\delta$rmax in a state where the limiting condition is established for a controlled variable of the steered angle varying unit 24. When a negative decision is made, the control returns to step 810 after the rear steering device 42 is controlled so that the steered angle $\delta$r of the rear wheels conforms to the target steered angle $\delta$rt in step 890. To the contrary, when an affirmative decision is made, the control according to the flowchart shown in FIG. 8 is once ended and the control returns to step 810 with no electric control current being supplied to the electric motor 48A of the rear steering device 42, i.e. no turning control of the left and right rear wheels 10RL and 10RR being executed by the rear steering device 42.

Thus, according to the second embodiment, the lowering in magnitude of a target yaw moment of the vehicle due to the limitation of the controlled variable can be supplemented with the compensation yaw moment Mcmp generated by the turn lateral forces of left and right rear wheels, which enables to effectively suppress the lowering of vehicle turning responsiveness to steering operation of a driver even in a state where the controlled variable of the steered angle varying unit 24 serving as a steerable wheel turning means is limited.

According to the second embodiment, in particular, when the limiting condition is established for a controlled variable of the steered angle varying unit 24 and urgent steering for avoiding danger is conducted by a driver, affirmative decisions are made in steps 820 and 840. And in step 850, when the target steered angle $\delta$nrt is not in-phase with the target steered angle $\delta$nft, a modification amount $\Delta\delta$rt for turning the rear wheels in the direction opposite to that of the front wheels is calculated, while on the other hand, when the target steered angle $\delta$nrt is in-phase with the target steered angle $\delta$nft, a modification amount $\Delta\delta$rt for turning the rear wheels in a direction that reduces the magnitude of the steered angle of the rear wheels is calculated.

Accordingly, even when urgent steering for avoiding danger is conducted by a driver in a state where the limiting condition is established for a controlled variable of the steered angle varying unit 24, it is possible to ensure good vehicle turning responsiveness to steering operation of a driver by suitably turning the rear wheels.

When the limiting condition is established for a controlled variable of the steered angle varying unit 24 but urgent steering for avoiding danger is not conducted by a driver, an affirmative decision is made in step 820 but a negative decision is made in step 840. And in step 855, a modification amount Δδrt of the steered angle of the rear wheels is calculated which is needed to conform the ratio between the modified target steered angle δrta of the rear wheels and the limited modified target steered angle δft of the front wheels to the ratio between the target steered angle δnrt of the rear wheels and the target steered angle δnft of the front wheels in a normal state where the limiting condition is not established for a controlled variable of the steered angle varying unit 24.

Accordingly, the ratio between the modified target steered angle δrta of the rear wheels and the limited modified target steered angle δft of the front wheels can be conformed to the ratio between the target steered angle δnrt of the rear wheels and the target steered angle δnft of the front wheels in a normal state where the limiting condition is not established for a controlled variable of the steered angle varying unit 24, which enables to positively prevent a driver from feeling odd due to the difference of steered angle ratio between the front and rear wheels from that in a normal state where the limiting condition is not established for a controlled variable of the steered angle varying unit 24 which is caused by a controlled variable of the steered angle varying unit 24 being limited.

Also according to the second embodiment, the compensation yaw moment Mcmp is generated by the turn lateral forces of the left and right rear wheels being turned to steer, as compared with the above-described first embodiment where the compensation yaw moment Mcmp is generated by braking force difference between the left and right wheels, unnecessary vehicle deceleration can more positively be avoided.

Third Embodiment

Figure 9:
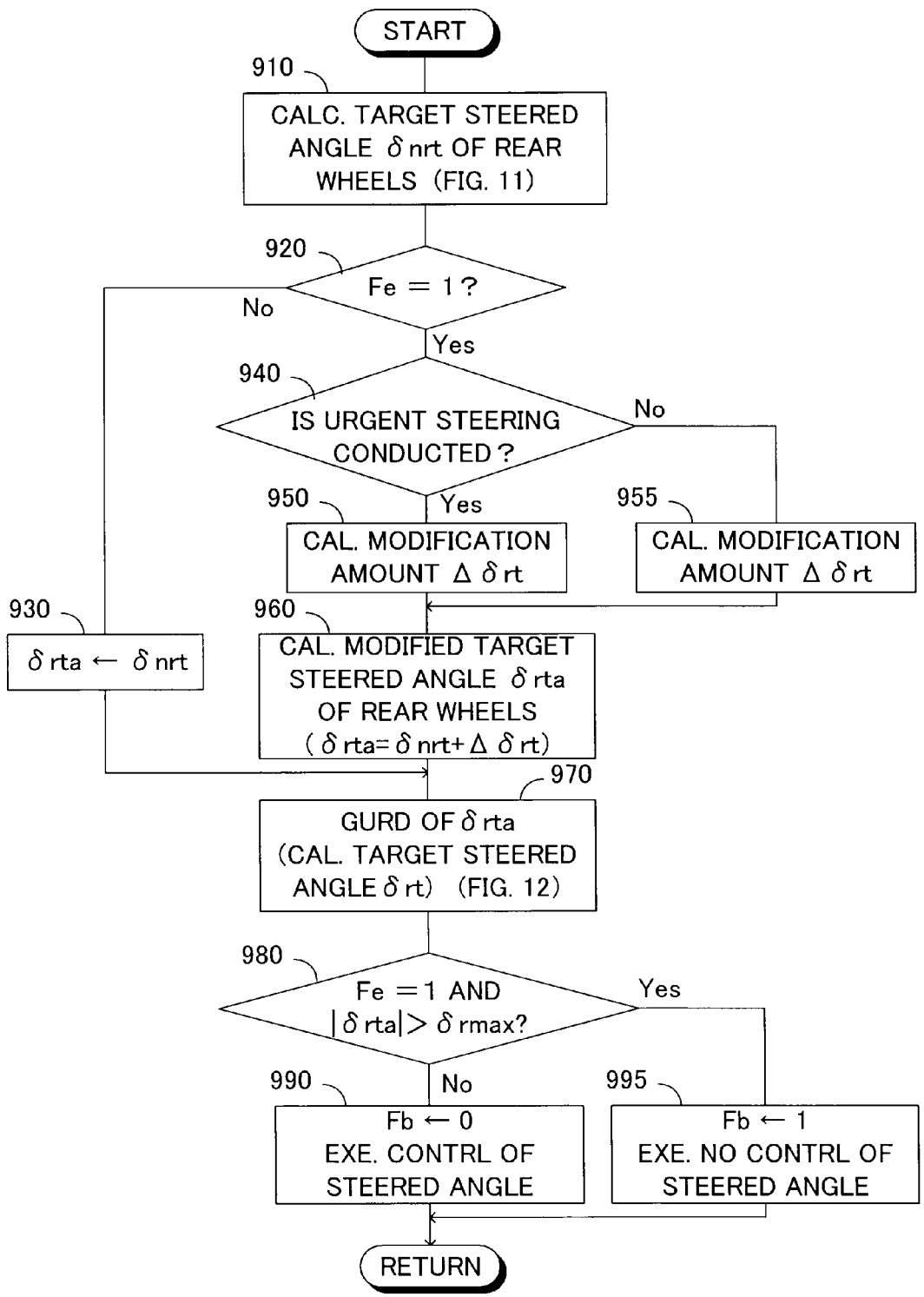
FIG. 9 is a flowchart showing the routine for controlling a steered angle of the rear wheels in the third embodiment.
Figure 10:
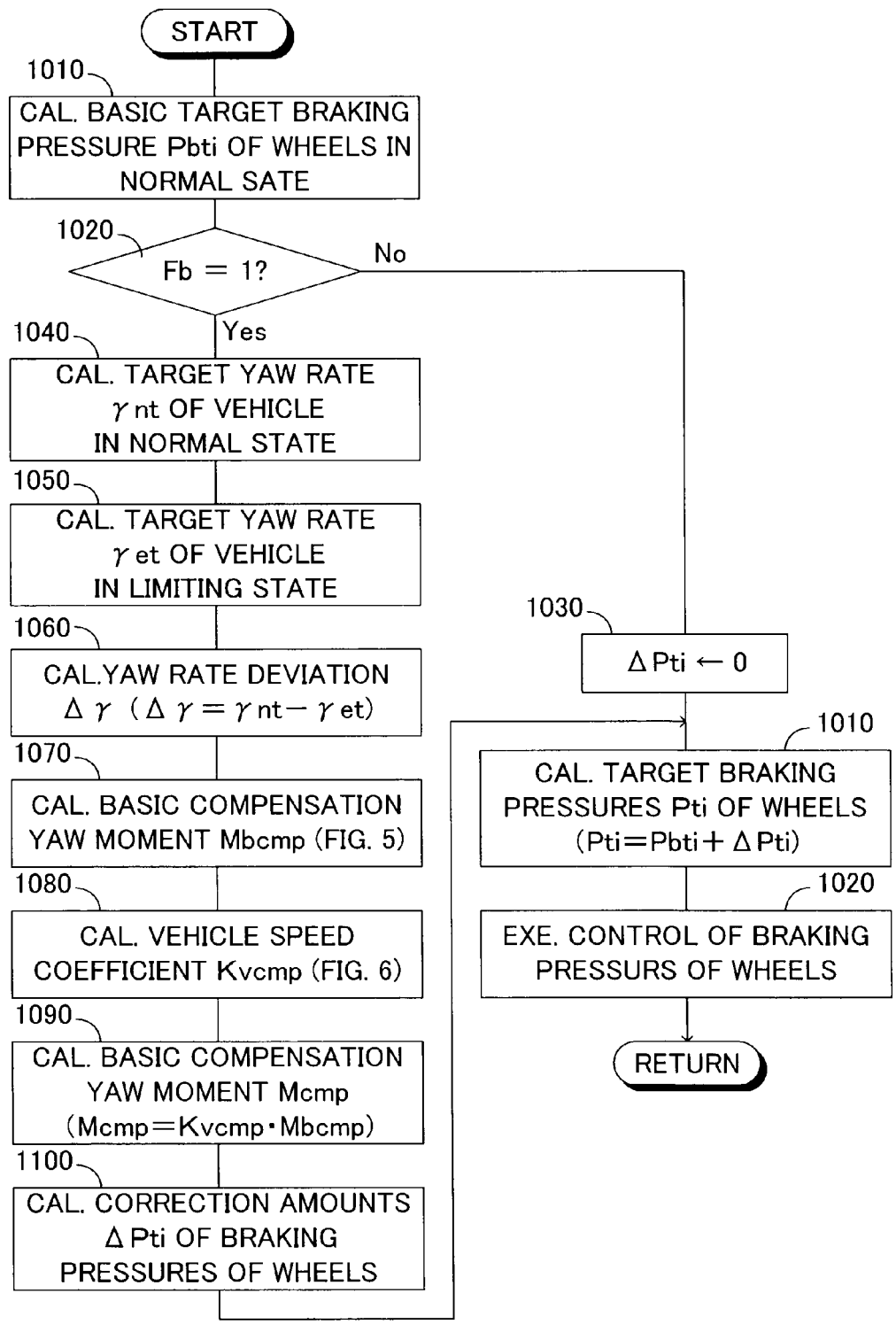
FIG. 10 is a flowchart showing the routine for controlling braking forces in the third embodiment.

FIG. 9 is a flowchart showing a routine for controlling a steered angle of rear wheels in a third embodiment of a vehicle travel control device according to the present invention which is applied to a vehicle in which steered angle of front and rear wheels can be controlled. FIG. 10 is a flowchart showing a routine for controlling braking forces in the third embodiment. In this connection, the controls according to the flowcharts shown in FIGS. 9 and 10 start with the turning on of an ignition switch, not shown, and are repeatedly executed at predetermined intervals of time.

In this third embodiment, although not shown in the figures, the vehicle has a steered angle varying unit 24 and a rear steering device 42 as with the second embodiment and the control of steered angle of front wheels is executed according to the flowchart shown in FIG. 2 as in the case of the above-described first embodiment. Also in the third embodiment, the steered angle of the rear wheels is controlled according to the flowchart shown in FIG. 9 and the braking forces of the individual wheels are controlled according to the flowchart shown in FIG. 10.

Steps 910-980 of the flowchart shown in FIG. 9 are performed as in the cases of steps 810-880, respectively, in the above-described second embodiment. In step 990 corresponding to step 890, the rear steering device 42 is controlled so that the steered angle δr of the rear wheels conforms to the target steered angle δrt and a flag Fb is reset to 0 so that it indicates that a compensation yaw moment by means of differences in braking force between the left and right wheels is not to be supplemented.

To the contrary, in step 995 corresponding to step 895, an electric control current is not supplied to the electric motor 48A of the rear steering device 42 and the flag Fb is set to 1 so that it indicates that a supplemental compensation yaw moment by means of differences in braking force between the left and right wheels is to be supplemented.

Steps 1010, 1060-1120 of the flowchart shown in FIG. 10 are performed as in the cases of steps 310, 360-420, respectively, in the above-described first embodiment. In step 1020 corresponding to step 320 of the flowchart shown in FIG. 3, a decision is made as to whether or not the flag Fb is 1, i.e. a supplemental compensation yaw moment by means of a difference in braking force between the left and right wheels is to be supplemented. When a negative decision is made, the control proceeds to step 1030, whereas when an affirmative decision is made, the control proceeds to step 1040.

In step 1050, a target yaw rate γnt of the vehicle in a normal state is calculated in a manner known in the art on the basis of the target steered angle δnft of the front wheels in a normal state calculated in step 210 of the flowchart shown in FIG. 2, the target steered angle δnrt of the rear wheels in a normal state calculated in step 910 of the flowchart shown in FIG. 9, and a vehicle speed V.

In step 1060, a target yaw rate γet of the vehicle in a state where the controlled variable is limited is calculated in a manner known in the art on the basis of the modified target steered angle δft of the front wheels calculated in step 250 of the flowchart shown in FIG. 2, the guarded target steered angle δrt of the rear wheels calculated in step 970 of the flowchart shown in FIG. 9, and a vehicle speed V.

Thus, according to the third embodiment, in addition to the same operations and working-effects as in the second embodiment being obtained, a deficient compensation yaw moment can be supplemented with a yaw moment generated by means of a difference in braking force between the left and right wheels when the turning of the rear steering device 42 is limited, which enables more positively to suppress the lowering of vehicle turning responsiveness to steering operation of a driver as compared with the above-described second embodiment under the situation where the controlled variable of the steered angle varying unit 24 is limited.

Notably, according to the second and third embodiment, in step 880 and 980, respectively, a decision is made as to whether or not the flag Fe is 1 and the magnitude of the modified target steered angle δrta of the rear wheels exceeds the upper limit value δrmax. And when an affirmative decision is made, no electric control current is supplied to the electric motor 48A of the rear steering device 42.

As described above, the rear steering device 42 is configured so that the electric motor 48A is not rotated by the forces which are received from road surface and are transmitted to the rack bar 48B. Accordingly, not only that the rear wheels can be prevented form excessively steered by the rear steering device 42, the rack bar 48B does not unduly move even when no electric control current is supplied to the electric motor 48A of the rear steering device 42, which enables to securely maintain the steered angle of the left and right rear wheels 10RL and 10RR without electric energy consumption.

While the present invention has been described in detail with reference to the above particular embodiments, it will be apparent to those skilled in the art that the present invention is not limited thereto, but may be embodied in various other forms without departing from the scope of the invention.

For example, in the above-described first and third embodiments, the basic compensation yaw moment Mbcmp for reducing the influence of limiting the controlled variable of the steered angle varying unit 24 on a turn yaw moment of the vehicle is calculated on the basis of the yaw rate deviation Δγ between the target yaw rate γnt of the vehicle in a normal state and the target yaw rate γet of the vehicle in a controlled variable limiting state. However, the basic compensation yaw moment Mbcmp may be calculated on the basis of any index value indicating that the limiting of the controlled variable of the steered angle varying unit 24 decreases the vehicle turning responsiveness to steering operation of a driver. For example, the index value may be the difference between a target lateral acceleration Gynt of the vehicle in a normal state and a target lateral acceleration Gyt of the vehicle in a controlled variable limiting state.

In the above-described first embodiment, the rear steering device 42 is not provided but the first embodiment may be applied to a vehicle having the rear steering device 42. In that case, the steered angle of the rear wheels is controlled as in the cases where the controlled variable of the steered angle varying unit 24 is not limited in the above-described second and third embodiments. And in step 340, the target yaw rate γnt of the vehicle in a normal state is calculated on the basis of the target steered angle δnft of the front wheels in a normal state calculated in step 210 of the flowchart shown in FIG. 2, the target steered angle δnrt of the rear wheels and a vehicle speed V.

Also in step 350, the target yaw rate γet of the vehicle in a controlled variable limiting state is calculated on the basis of the modified target steered angle δft of the front wheels calculated in step 250 of the flowchart shown in FIG. 2, the target steered angle δnrt of the rear wheels and a vehicle speed V.

Again in the above-described first and third embodiments, braking force difference between the wheels is controlled to generate a necessary yaw moment independently of the lateral forces of the steerable wheels. However, in a vehicle in which driving forces of the individual wheels can be controlled as well as the braking forces, the difference between front-rear forces of the left and right wheels may be controlled to generate a necessary yaw moment in a manner known in the art by controlling braking and driving forces of the individual wheels. Notably, according to this configuration, as compared with the case where the difference in braking force between the left and right wheels is controlled, unnecessary deceleration of the vehicle can more effectively be prevented.

Further in the above-described embodiments, the steered angle varying unit 24 is configured to rotate the lower steering shaft 26 relative to the upper steering shaft 22 to thereby automatically turn the left and right front wheels 10FL and 10FR to steer independently of steering operation of a driver. However, a steerable wheel turning means may be of any type known in the art such as a steered angle varying unit of the type in which, for example, tie rods 20L and 20R are elongated and retracted, as long as it is capable of turning steerable wheels to steer independently of steering operation of a driver.

The invention claimed is:

1. A vehicle travel control device having a steerable wheel turning means capable of turning steerable wheels to steer independently of steering operation of a driver and a turn assist yaw moment generating means capable of generating a turn assist yaw moment independently of lateral forces of the steerable wheels, and said vehicle travel control device has a control means which alters a controlled variable of said turn assist yaw moment generating means to thereby reduce the influence of limiting a controlled variable of said steerable wheel turning means on a turn yaw moment of the vehicle when a predetermined limiting condition is established and the controlled variable of said steerable wheel turning means is limited, wherein
   said steerable wheels are left and right front wheels;
   said turn assist yaw moment generating means includes a rear wheel turning means which is capable of supplementarily turning left and right rear wheels to steer;
   said steerable wheel turning means operates with an electric energy supplied from a power source;
   said control means determines that said predetermined limiting condition is established when the electric energy consumed by said steerable wheel turning means is to be saved; and
   said control means calculates a modification amount of a steered angle of the left and right rear wheels for reducing the influence of limiting the controlled variable of said steerable wheel turning means on the turn assist yaw moment of the vehicle when said predetermined limiting condition is established and modifies a target steered angle of the left and right rear wheels with said modification amount.

2. A vehicle travel control device according to claim 1, wherein said steerable wheel turning means has a wheel-turning controlled variable determining means which determines a wheel-turning controlled variable of said steerable wheel turning means for said steerable wheels in accordance with steering operation of a driver, a limit value determining means which determines a limit value on said wheel-turning controlled variable when said predetermined limiting condition is established, and a wheel-turning controlled variable limiting means which limits said wheel-turning controlled variable with said limit value.

3. A vehicle travel control device according to claim 1 or 2, wherein the vehicle has a steering assist force generating means which operates with the electric energy supplied from the power source and generates a steering assist force at least in accordance with a steering reactive force detected by a sensor and said control means determines that said predetermined limiting condition is established when velocity of turning said steerable wheels by said steerable wheel turning means is to be reduced in magnitude in order to ensure the capability of said steering assist force generating means to generate a required steering assist force.

4. A vehicle travel control device according to claim 1 or 2, wherein said turn assist yaw moment generating means includes a braking-driving force control means which is capable of controlling braking-driving forces of left and right wheels independently to each other and said control means calculates a compensation yaw moment for reducing the influence of limiting the controlled variable of said steerable wheel turning means on the turn yaw moment of the vehicle when said predetermined limiting condition is established and modifies the braking-driving forces of the left and right wheels so that said compensation yaw moment is generated by a difference in braking-driving force between the left and right wheels.

5. A vehicle travel control device according to claim 4, wherein even when said predetermined limiting condition is established, said control means does not modify the braking-driving forces of the left and right wheels to generate said compensation yaw moment under the situation where a vehicle speed is not more than a reference value.

6. A vehicle travel control device according to claim 1, wherein said control means calculates a modification amount for turning the left and right rear wheels in a direction opposite to that of the left and right front wheels when the left and right rear wheels are not turned in-phase with the left and right front wheels under the situation where said predetermined limiting condition is established and urgent steering for avoiding a danger is conducted by the driver.

7. A vehicle travel control device according to claim 1, wherein said control means calculates a modification amount for turning the left and right rear wheels in a direction that reduces the magnitude of the steered angle of the left and right rear wheels when the left and right rear wheels are turned in-phase with the left and right front wheels under the situation where said predetermined limiting condition is established and urgent steering for avoiding danger is conducted by the driver.

8. A vehicle travel control device according to claim 1, wherein under the situation where said predetermined limiting condition is established and urgent steering for avoiding danger is not conducted by the driver, said control means calculates a modification amount of the steered angle of the left and right rear wheels for conforming a ratio between the modified target steered angle of the left and right rear wheels and limited target steered angle of the left and right front wheels to a ratio between the a target steered angle of the left and right rear wheels and a target steered angle of the left and right front wheels in a normal state where said predetermined limiting condition is not established.

9. A vehicle travel control device having a steerable wheel turning means capable of turning steerable wheels to steer independently of steering operation of a driver and a turn assist yaw moment generating means capable of generating a turn assist yaw moment independently of lateral forces of the steerable wheels, and said vehicle travel control device has a control means which alters a controlled variable of said turn assist yaw moment generating means to thereby reduce the influence of limiting a controlled variable of said steerable wheel turning means on a turn yaw moment of the vehicle when a predetermined limiting condition is established and the controlled variable of said steerable wheel turning means is limited, wherein said steerable wheels are left and right front wheels;

said turn assist yaw moment generating means includes a braking-driving force control means which is capable of controlling braking-driving forces of left and right wheels independently to each other and a rear wheel turning means which is capable of supplementarily turning left and right rear wheels to steer;

said steerable wheel turning means operates with an electric energy supplied from a power source;

said control means determines that said predetermined limiting condition is established when the electric energy consumed by said steerable wheel turning means is to be saved; and said control means places priority on the alteration of a controlled variable of said rear wheel turning means over the alteration of a controlled variable of said braking-driving force control means on an occasion of altering the controlled variables to reduce the influence of limiting the controlled variable of said steerable wheel turning means on the turn yaw moment of the vehicle.

10. A vehicle travel control device according to claim 9, wherein said rear wheel turning means includes an electric drive means which drivingly turns the left and right rear wheels to steer; said electric drive means is configured to be controlled to operate but not to be activated by forces which the rear wheels receive from road surface; said control means do not activate said drive means when a target steered angle of the left and right rear wheels is greater in magnitude than a reference steered angle.

11. A vehicle travel control device according to claim 9, wherein said control means calculates a compensation yaw moment for reducing the influence of limiting the controlled variable of said steerable wheel turning means on the turn yaw moment of the vehicle when said predetermined limiting condition is established, and said control means executes a control to generate said compensation yaw moment solely by means of the turning of the rear wheels by said rear wheel turning means when said compensation yaw moment is not more than a yaw moment, in magnitude, which can be generated by turning the rear wheels and, while on the other hand, executes a control to generate said compensation yaw moment by means of the turning of the rear wheels by said rear wheel turning means and the control of a difference in braking-driving force between the left and right wheels by said braking-driving force control means when said compensation yaw moment is more than the yaw moment, in magnitude, which can be generated by turning the rear wheels.

12. A vehicle travel control device according to claim 9, wherein said control means places priority on the alteration of the controlled variable of said rear wheel turning means over the alteration of the controlled variable of said braking-driving force control means by initiating the alteration of the controlled variable of said rear wheel turning means earlier than the alteration of the controlled variable of said braking-driving force control means.

* * * * *